United States Patent
Peleg et al.

(10) Patent No.: US 7,406,614 B2
(45) Date of Patent: Jul. 29, 2008

(54) ELECTRONICALLY IMPLEMENTED DYNAMIC START UP METHOD FOR PORTS WITH INRUSH CURRENT LIMITING FUNCTIONALITY

(75) Inventors: Amir Peleg, Tel Aviv (IT); Shimon Elkayam, Kfar Sava (IT); Nadav Barnea, Neve Savion (IT)

(73) Assignee: Microsemi Corp. - Analog Mixed Signal Group, Ltd., Hod Hasharon (IL)

( * ) Notice: Subject to any disclaimer, the term of this patent is extended or adjusted under 35 U.S.C. 154(b) by 467 days.

(21) Appl. No.: 11/019,275

(22) Filed: Dec. 23, 2004

(65) Prior Publication Data

US 2006/0143488 A1      Jun. 29, 2006

(51) Int. Cl.
G06F 1/26 (2006.01)

(52) U.S. Cl. .................... 713/320; 713/300; 713/320; 713/323; 713/330; 379/93.36; 379/348; 725/150

(58) Field of Classification Search .................. 713/320
See application file for complete search history.

(56) References Cited

U.S. PATENT DOCUMENTS

| | | | | |
|---|---|---|---|---|
| 5,214,930 A | * | 6/1993 | Bendtsen | 62/115 |
| 5,763,960 A | * | 6/1998 | Ceccherelli et al. | 307/41 |
| 6,000,042 A | * | 12/1999 | Henrie | 714/40 |
| 6,137,668 A | * | 10/2000 | Feldtkeller | 361/103 |
| 6,628,491 B1 | * | 9/2003 | Tihanyi et al. | 361/93.8 |
| 6,640,308 B1 | * | 10/2003 | Keyghobad et al. | 713/300 |
| 6,643,566 B1 | * | 11/2003 | Lehr et al. | 700/286 |
| 6,681,848 B2 | * | 1/2004 | Breeden | 165/238 |
| 7,076,013 B2 | * | 7/2006 | Cho | 375/354 |
| 2005/0272402 A1 | * | 12/2005 | Ferentz et al. | 455/402 |

* cited by examiner

*Primary Examiner*—Nitin C Patel
(74) *Attorney, Agent, or Firm*—Simon Kahn

(57) ABSTRACT

A power over Ethernet controller comprising: control circuitry; at least one temperature sensor operatively connected to the control circuitry; and a plurality of electronically controlled switches responsive to the control circuit, each of the electronically controlled switches enabling power to a respective port and having associated therewith inrush current limiting functionality, the control circuit being operative to input at least one temperature indication from the at least one temperature sensor; operate at least one of the plurality of electronically controlled switches thereby enabling power to a first port; and delay a time period dependent on the at least one temperature indication, whereby operation of a second of the plurality of electronically controlled switches to enable power to a second port is permitted only after the delayed time period.

19 Claims, 3 Drawing Sheets

ELECTRONICALLY IMPLEMENTED DYNAMIC START UP METHOD FOR PORTS WITH INRUSH CURRENT LIMITING FUNCTIONALITY

BACKGROUND OF THE INVENTION

The present invention relates to the field of powering ports, and more particularly to a controller having a plurality of on-board electronically controlled switches and a dynamic algorithm for powering a plurality of ports.

The growth of local and wide area networks based on Ethernet technology has been an important driver for cabling offices and homes with structured cabling systems having multiple twisted wire pairs. The ubiquitous local area network, and the equipment which operates thereon, has led to a situation where there is often a need to attach a network operated device for which power is to be advantageously supplied by the network over the network wiring. Supplying power over the network wiring has many advantages including, but not limited to; reduced cost of installation; centralized power and power back-up; and centralized security and management.

Several patents addressed to this issue exist including: U.S. Pat. Ser. No. 6,473,608 issued to Lehr et al., whose contents are incorporated herein by reference and U.S. Pat. Ser. No. 6,643,566 issued to Lehr et al., whose contents are incorporated herein by reference. Furthermore a standard addressed to the issue of powering remote devices over an Ethernet based network has been published as IEEE 802.3af -2003, whose contents are incorporated herein by reference.

An Ethernet switch or midspan module providing power over Ethernet functionality is typically designed to support a plurality of ports, and power is preferably to be supplied to compatible equipment rapidly after detection. Power is typically supplied under control of a power over Ethernet controller, the power over Ethernet controller energizing for each port to be powered an electronically controlled switch, which in an exemplary embodiment comprises a power MOSFET. In another embodiment the electronically controlled switch comprises a FET or bipolar transistor. At port start up, the inrush current to a remotely powered device, which typically comprises a large input capacitor, must be limited. In order to reduce cost and minimize the footprint, preferably the required electronically controlled switches are provided embedded within the power over Ethernet controller. Unfortunately, embedding a plurality of electronically controlled switches having associated therewith inrush current limiting functionality leads to thermal issues that must be dealt with.

What is needed, and not supplied by the prior art, is a controller having a dynamic start up algorithm, which enables rapid turn on of a plurality of electronically controlled switches, while taking into account thermal requirements.

SUMMARY OF THE INVENTION

Accordingly, it is a principal object of the present invention to overcome the disadvantages of prior art. This is provided in the present invention by a power over Ethernet controller serving a plurality of ports having on board a plurality of electronically controlled switches having associated therewith inrush current limiting functionality. In an exemplary embodiment the electronically controlled switches each comprise a power MOSFET. In another embodiment the electronically controlled switches each comprise a bipolar transistor or FET. A separate electronically controlled switch is supplied for each port. At least one temperature indication is input and a delay dependent on the input temperature indication is instituted. Thus, after energizing a first electronically controlled switch having inrush current limiting functionality associated therewith to supply power to a first port, a temperature dependent delay occurs prior to energizing a second electronically controlled switch supplying power to a second port.

The invention provides for a power over Ethernet controller comprising: control circuitry at least one temperature sensor operatively connected to the control circuitry; and a plurality of electronically controlled switches responsive to the control circuit, each of the electronically controlled switches enabling power to a respective port and having associated therewith inrush current limiting functionality, the control circuit being operative to input at least one temperature indication from the at least one temperature sensor; operate at least one of the plurality of electronically controlled switches thereby enabling power to a first port; and delay a time period dependent on the at least one temperature indication, whereby operation of a second of the plurality of electronically controlled switches to enable power to a second port is permitted only after the delayed time period.

In one embodiment the plurality of electronically controlled switches comprise one of a FET, a bipolar transistor and a power MOSFET. In another embodiment the control circuit is further operable to compare the at least one temperature indication with a maximum, and only in the event the at least one temperature indication does not exceed the maximum to operate the at least one of the plurality of switches to enable power to the first port. In one embodiment the control circuitry and the electronically controlled switches comprise a single integrated circuit.

In a preferred embodiment the at least one temperature sensor comprises a plurality of temperature sensors and the at least one temperature indication comprises a plurality of temperature indications each from a unique one of the plurality of temperature sensors, the time period being dependent on a function of the plurality of temperature indications. In one further preferred embodiment the function comprises an average of the plurality of temperature indications. In another further preferred embodiment the function comprises one of a weighted average of the plurality of temperature indications and a maximum of the plurality of temperature indications.

In an exemplary embodiment the time period is further dependent on at least one of package type, die heat conduction parameters and the presence or absence of heat conductive adhesive.

The invention also provides for a dynamic successive start up algorithm comprising: inputting at least one indication of temperature; activating power to a first port; and delaying a time period dependent on the at least one indication of temperature, whereby activating power to a second port is permitted only after the delayed time period.

In one embodiment the algorithm further comprises prior to the activating power to a first port, comparing the at least one temperature indication with a maximum, and only in the event the at least one temperature indication does not exceed the maximum activating the power to the first port.

In another embodiment the at least one indication of temperature comprises a plurality of indications of temperature, the time period being dependent on a function of the plurality of indications of temperature. Preferably the function comprises one of an average, a weighted average and a maximum of the plurality of indications of temperature. In yet another embodiment the time period is further dependent on at least one of package type, die heat conduction parameters and the presence or absence of heat conductive adhesive.

The invention also provides for a dynamic successive start up algorithm comprising: inputting at least one indication of temperature; comparing the at least one indication of temperature with a pre-determined maximum, in the event that the at least one indication of temperature does not exceed the maximum, activating power to a first port; and delaying a time period dependent on the at least one indication of temperature, whereby activating power to a second port is permitted only after the delayed time period.

In one embodiment the at least one indication of temperature comprises a plurality of indications of temperature, the time period being dependent on a function of the plurality of indications of temperature. Preferably the function comprises one of an average, a weighted average and a maximum of the plurality of indications of temperature. In another embodiment the time period is further dependent on at least one of package type, die heat conduction parameters and the presence or absence of heat conductive adhesive.

The invention also provides for a power over Ethernet controller comprising: control circuitry; at least one temperature sensor operatively connected to the control circuitry; and a plurality of electronically controlled switches responsive to the control circuit, each of the electronically controlled switches enabling power to a respective port and having associated therewith inrush current limiting functionality, the control circuit being operative to: input at least one indication of temperature from the at least one temperature sensor; operate at least one of the plurality of electronically controlled switches thereby enabling power to a first port; and delay a time period dependent on a function of the at least one temperature indication and at least one of package type, die heat conduction parameters and the presence or absence of heat conductive adhesive, whereby operation of a second of the plurality of electronically controlled switches to enable power to a second port is permitted only after the delayed time period.

In one embodiment the control circuit is further operable to compare the at least one temperature indication with a maximum, and only in the event the at least one temperature indication does not exceed the maximum to operate the at least one of the plurality of switches to enable power to the first port. In another embodiment the control circuitry and the electronically controlled switches comprise a single integrated circuit.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Figure 1:
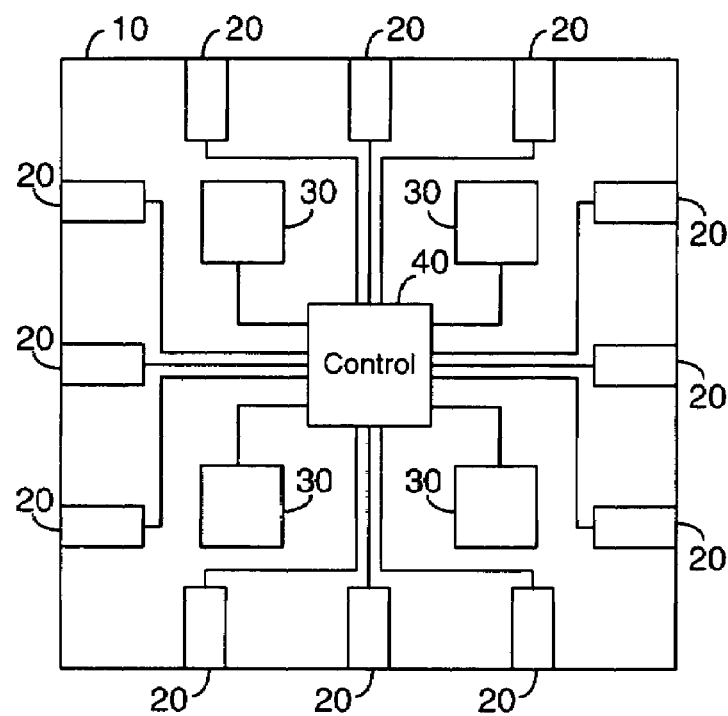
FIG. 1 is a high level schematic diagram of a power over Ethernet controller serving 12 ports having control circuitry and temperature sensors in accordance with the principle of the invention.

The present embodiments enable a power over Ethernet controller serving a plurality of ports having on board a plurality of electronically controlled switches providing inrush current limiting functionality. In an exemplary embodiment the electronically controlled switches each comprise a power MOSFET. In another embodiment the electronically controlled switches each comprise a bipolar transistor or FET. A separate electronically controlled switch is supplied for each port. At least one temperature indication is input and a delay dependent on the input temperature indication is instituted. Thus, after energizing a first electronically controlled switch having inrush current limiting functionality associated therewith to supply power to a first port, a temperature dependent delay occurs prior to energizing a second electronically controlled switch supplying power to a second port.

It is to be understood the inrush current limiting functionality is a significant generator of heat. The electronically controlled switches are herein described as having associated therewith inrush current limiting functionality. The inrush current limiting functionality may be supplied inherently as part of the switch, or as a separate circuit or component without exceeding the scope of the invention. In an exemplary embodiment a power MOSFET is used as the electronically controlled switch, and the gate voltage is controlled to ensure a limited inrush current.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic diagram of a power over Ethernet controller 10 serving 12 ports, each of the ports receiving power via a respective electronically controlled switch 20, and having control circuitry 40 and temperature sensors 30 in accordance with the principle of the invention. Control circuitry 40 comprises a state machine, which in an exemplary embodiment is a micro-controller. In an exemplary embodiment each electronically controlled switch 20 comprises an FET, preferably a power MOSFET. In another embodiment each electronically controlled switch 20 comprises a bipolar transistor. Each electronically controlled switch has associated therewith inrush current limiting functionality. The inrush current limiting functionality may be supplied inherently as part of the switch, or as a separate circuit or component without exceeding the scope of the invention. In an exemplary embodiment a power MOSFET is used as the electronically controlled switch, and the gate voltage is controlled to ensure a limited inrush current.

Each electronically controlled switch 20 is operatively connected to an output of control circuitry 40. Control circuitry 40 is operatively connected to receive an indication of temperature from each temperature sensor 30. A total of 4 temperature sensors 30 are shown, however this is not meant to be limiting in any way. More or less than 4 temperature sensor 30 may be utilized without exceeding the scope of the invention. The use of 4 temperature sensors with 12 electronically controlled switches provides local temperature information while maintaining a reasonable cost. A total of 12 electronically controlled switches 20 are illustrated, however this is not meant to be limiting in any way. More or less than 12 electronically controlled switches 20 may be utilized without exceeding the scope of the invention.

In operation, control circuitry 40 identifies a valid powered device (not shown) connected to a port in a manner known to those skilled in the art, and preferably in accordance with IEEE 802.3af. Control circuitry 40 then inputs a temperature indication from at least one temperature sensor 30 and enables power to the identified valid powered device by energizing, or enabling, the appropriate electronically controlled switch 20. Each electronically controlled switch 20 enables power to a specific port with which it is associated while providing inrush current limiting functionality. The term energizing the electronically controlled switch 20 is used interchangeably with the terms enabling power to the port and activating power to the port throughout this document. After enabling a first port, a delay is instituted in a manner to be described further hereinto below, prior to enabling power to a second port. The delay is dependent on the input temperature indication as well as on other design dependent factors. In an exemplary embodiment the delay amount is dependent on the temperature indication and at least one of package type, die heat conduction parameters and the presence or absence of heat conductive adhesive.

Figure 2:
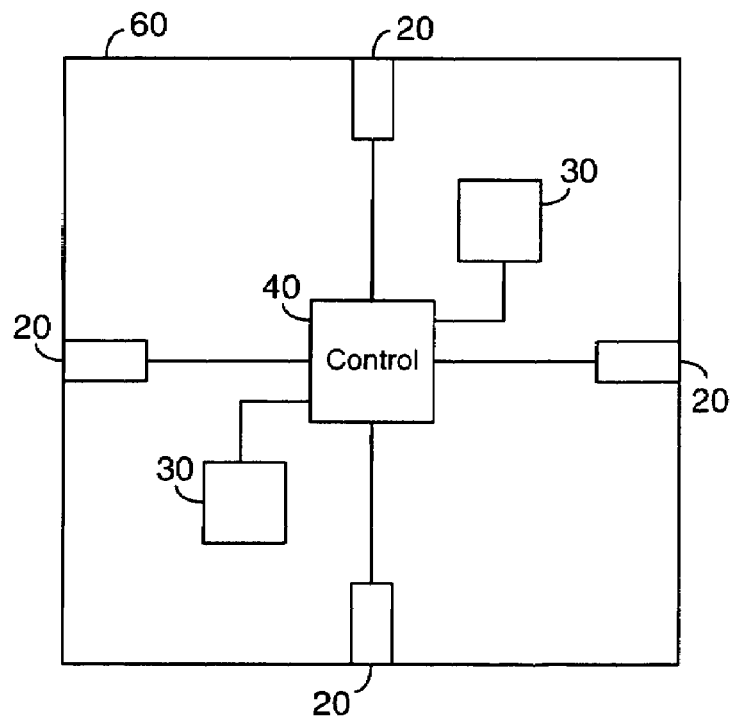
FIG. 2 is a high level schematic diagram of a power over Ethernet controller serving 4 ports having control circuitry and temperature sensors in accordance with the principle of the invention.

FIG. 2 is a high level schematic diagram of a power over Ethernet controller 60 serving 4 ports, each of the ports receiving power via a respective electronically controlled switch 20, and having control circuitry 40 and temperature sensors 30 in accordance with the principle of the invention. Control circuitry 40 comprises a state machine, which in an exemplary embodiment is a micro-controller. In an exemplary embodiment each electronically controlled switch 20 comprises an FET, preferably a power MOSFET. In another embodiment each electronically controlled switch 20 comprises a bipolar transistor. Each electronically controlled switch has associated therewith inrush current limiting functionality. The inrush current limiting functionality may be supplied inherently as part of the switch, or as a separate circuit or component without-exceeding the scope of the invention. In an exemplary embodiment a power MOSFET is used as the electronically controlled switch, and the gate voltage is controlled to ensure a limited inrush current.

Each electronically controlled switch 20 is operatively connected to an output of control circuitry 40. Control circuitry 40 is operatively connected to receive an indication of temperature from each temperature sensor 30. A total of 2 temperature sensors 30 are shown, however this is not meant to be limiting in any way. More or less than 2 temperature sensor 30 may be utilized without exceeding the scope of the invention. The use of 2 temperature sensors with 4 electronically controlled switches provides local temperature information while maintaining a reasonable cost. A total of 4 electronically controlled switches 20 are illustrated, however this is not meant to be limiting in any way. More or less than 4 electronically controlled switches 20 may be utilized without exceeding the scope of the invention.

In operation, control circuitry 40 identifies a valid powered device (not shown) connected to a port in a manner known to those skilled in the art, and preferably in accordance with IEEE 802.3af. Control circuitry 40 then inputs a temperature indication from at least one temperature sensor 30 and enables power to the identified valid powered device by energizing, or enabling, the appropriate electronically controlled switch 20. Each electronically controlled switch 20 enables power to a specific port with which it is associated while providing inrush current limiting functionality. After enabling a first port, a delay is instituted in a manner to be described further hereinto below, prior to enabling power to a second port. The delay is dependent on the input temperature indication as well as on other design dependent factors. In an exemplary embodiment the delay amount is dependent on the temperature indication and at least one of package type, die heat conduction parameters and the presence or absence of heat conductive adhesive.

Figure 3:
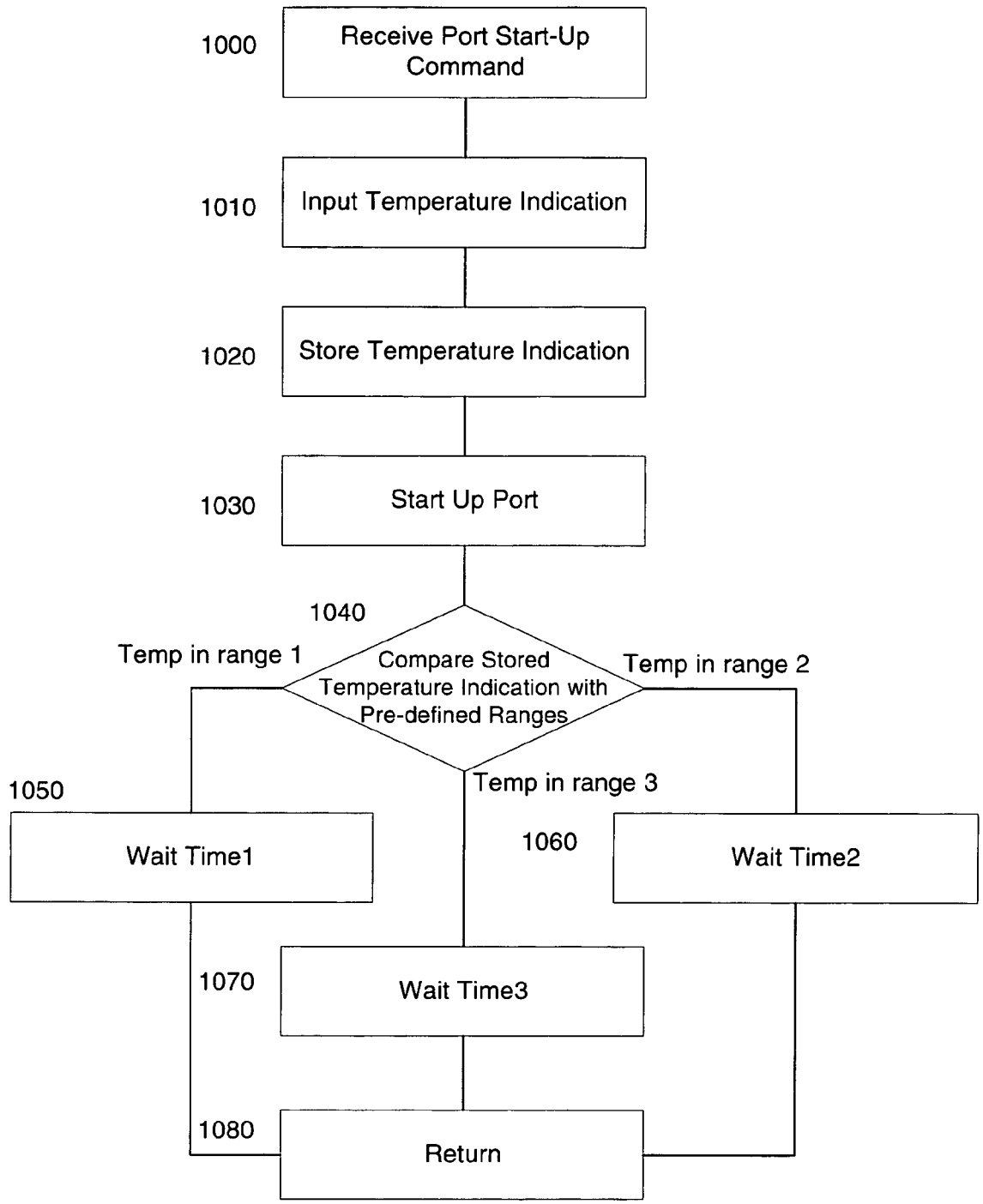
FIG. 3 illustrates a high level flow chart of an embodiment of the operation of the control circuitry of the power over Ethernet controller of FIG. 1 or 2 in accordance with the principle of the invention.

FIG. 3 illustrates a high level flow chart of an embodiment of the operation of control circuitry 40 of power over Ethernet controller 10, 60 respectively of FIGS. 1 and 2 in accordance with the principle of the invention. In stage 1000, control circuitry 40 begins the port powering routine. The port powering routine of FIG. 3 is executed upon identification of a valid powered device connected to an unpowered port, and receipt by the port powering routine of a port start-up command.

The port start-up command may be generated internally to power over Ethernet controller 10, 60 or may be received from an external host or supervisory circuitry without exceeding the scope of the invention. It is to be understood that at start-up of power over Ethernet controller 10, 60 a plurality of attached valid powered devices may be detected. Powering of each port is preferably accomplished in accordance with the routing of FIG. 3.

In stage 1010 a temperature indication is input. In an exemplary embodiment all temperature sensors 30 are input, and an average of the temperature sensors 30 is calculated. In another embodiment temperature sensors 30 associated with the port to be powered are input. In yet another embodiment all temperature sensors 30 are input and a function, which in a preferred embodiment is a weighted function, of the plurality of temperature sensors 30 is calculated. In yet another embodiment a maximum of all temperature sensors 30 is found.

In stage 1020 the input temperature information is stored. In one embodiment the average of the temperature sensors calculated in stage 1010 is stored. In another embodiment the input temperature indication information is stored. In yet another embodiment a function of the temperature sensors is stored. In yet another embodiment, a maximum is stored.

In stage 1030 the port that is to be enabled, as indicated by the initially received port start up command is enabled. In an exemplary embodiment this is accomplished by energizing the appropriate electronically controlled switch 20 associated with the port to be enabled.

In stage 1040 the temperature information stored in stage 1020 is compared with a plurality of pre-determined ranges. The value for the ranges are preferably selected based on least one of package type, die heat conduction parameters and the presence or absence of heat conductive adhesive.

In the event that the temperature information stored in stage 1020 is in a first range, then in stage 1050 a first wait time is incurred. It is to be understood that a wait time can be incurred by any means known to those skilled in the art including but not limited to loading a timer with a pre-selected number and receiving an interrupt upon exhaustion of the timer. In another embodiment a timer is loaded with a pre-selected number, and the timer condition is consulted prior to proceeding to a subsequent stage. The value of the first wait time is pre-determined based on at least one of package type, die heat conduction parameters and the presence or absence of heat conductive adhesive. In stage 1080 the routine returns.

In the event that in stage 1040 the temperature information stored in stage 1020 is in a second range, then in stage 1060 a second wait time is incurred. The value of the second wait time is pre-determined based on at least one of package type, die heat conduction parameters and the presence or absence of heat conductive adhesive. In stage 1080 the routine returns.

In the event that in stage 1040 the temperature information stored in stage 1020 is in a third range, then in stage 1070 a third wait time is incurred. The value of the third wait time is pre-determined based on at least one of package type, die heat conduction parameters and the presence or absence of heat conductive adhesive. In stage 1080 the routine returns.

The routine of FIG. 3 has been described having three different temperature ranges and wait times, however this is not meant to be limiting in any way. More or less ranges may be selected without exceeding the scope of the invention. In another embodiment the wait time is calculated as a function of the stored temperature indication and other design dependent factors such as package type, die heat conduction parameters and the presence or absence of heat conductive adhesive. The calculated wait time is then taken as the delay without reference to pre-determined ranges.

Stage 1080 is described herein as a return to a main program, however this is not meant to be limiting in any way. In one embodiment the timer of one of stages 1050, 1060 and 1070 informs a main program that entry into, or the operation of, stages 1000, 1010 is permitted. In yet another embodiment, the timer of one of stage 1050, 1060 and 1070 sets a flag which is consulted by a main program prior to the entry into, or the operation of, stages 1000, 1010.

The routine of FIG. 3 has been described as having the temperature indication input prior to enabling the port. This is not meant to be limiting in any way, and is specifically meant to include inputting the temperature after enabling the port.

Figure 4:
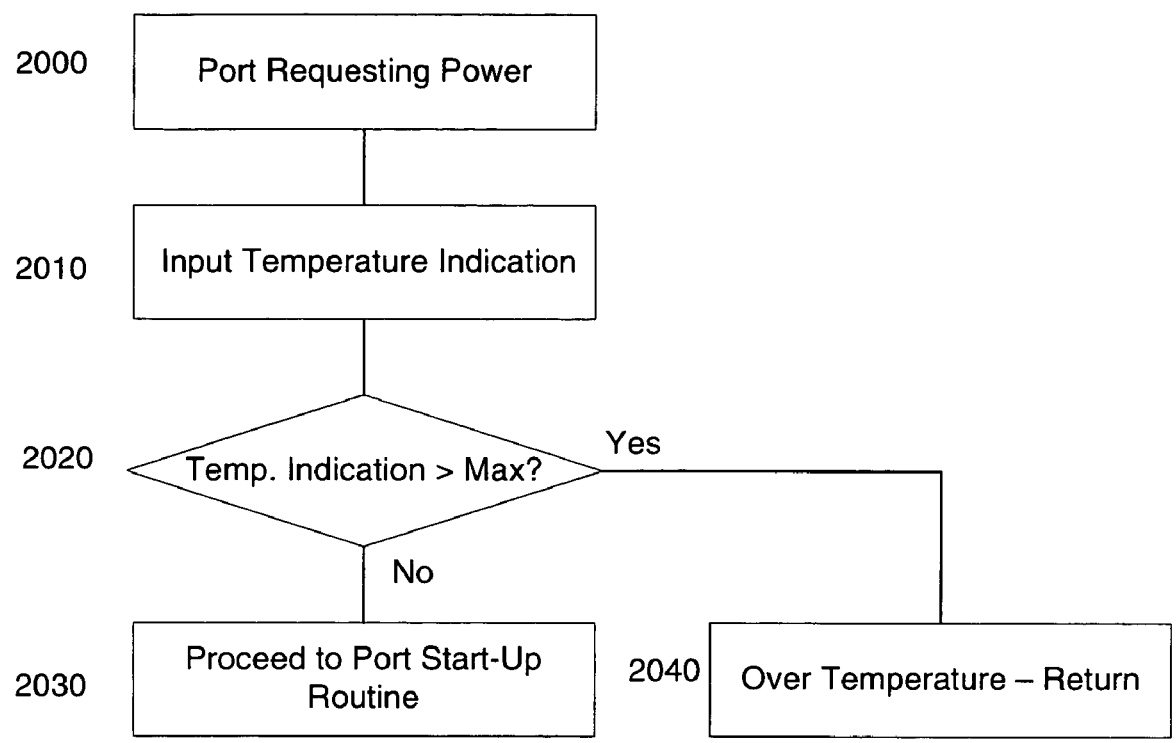
FIG. 4 illustrates a high level flow chart of an embodiment of an improved pre-cursor operation of the control circuitry of the power over Ethernet controller of FIG. 1 or 2 in accordance with the principle of the invention.

FIG. 4 illustrates a high level flow chart of an embodiment of an improved pre-cursor operation of control circuitry 40 of FIGS. 1 and 2 in accordance with the principle of the invention. The improved pre-cursor operation ensures that the temperature indication is below a pre-determined maximum temperature prior to enabling the port start up routine of FIG. 3.

A port start-up command may be generated internally to power over Ethernet controller 10, 60 or may be received from an external host or supervisory circuitry without exceeding the scope of the invention. It is to be understood that at start-up of power over Ethernet controller 10, 60 a plurality of attached valid powered devices may be detected. Powering of each port is preferably accomplished in accordance with the routines of FIGS. 3 and 4.

In stage 2000 a valid unpowered powered device is identified connected to a port of power over Ethernet controller 10, 60, and a port start-up command has been received. In stage 2010 a temperature indication is input. In one embodiment all temperature sensors 30 are input and an average is taken, in another embodiment only temperature sensors 30 associated with port identified in stage 2000 are input, and in yet another embodiment all temperature sensors 30 are input and a function, preferably a weighted function, is calculated. In yet another embodiment a maximum value of the temperatures sensors 30 is found and used in subsequent stages.

In stage 2020 the temperature indication of stage 2010 is compared with a pre-determined maximum temperature. In the event that in stage 2020 the temperature is not greater than the pre-determined maximum temperature, in stage 2030 the port start up routine of FIG. 3 is called.

In the event that in stage 2020 the temperature is greater than the pre-determined maximum temperature, in stage 2040 an over temperature condition flag is set and the program returns without proceeding to the port start-up routine of FIG. 3.

Thus, the present embodiments enable a power over Ethernet controller serving a plurality of ports having on board a plurality of electronically controlled switches providing inrush current limiting functionality. In an exemplary embodiment the electronically controlled switches each comprise a power MOSFET. In another embodiment the electronically controlled switches each comprise a bipolar transistor or FET. A separate electronically controlled switch is supplied for each port. At least one temperature indication is input and a delay dependent on the input temperature indication is instituted. Thus, after energizing a first electronically controlled switch having inrush current limiting functionality associated therewith to supply power to a first port, a temperature dependent delay occurs prior to energizing a second electronically controlled switch supplying power to a second port. Such a temperature dependent delay enables rapid turn on of successive ports while preventing thermal damage.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

We claim:

1. A power over Ethernet controller comprising:
   control circuitry;
   at least one temperature sensor operatively connected to said control circuitry; and a plurality of electronically controlled switches responsive to said control circuit, each of said electronically controlled switches enabling power to a respective port and having associated therewith inrush current limiting functionality, said control circuit being operative to input at least one temperature indication from said at least one temperature sensor; operate at least one of said plurality of electronically controlled switches thereby enabling power to a first port; and delay a time period dependent on said at least one temperature indication, whereby operation of a second of said plurality of electronically controlled switches to enable power to a second port is permitted only after said delayed time period.

2. A power over Ethernet controller according to claim 1, wherein said plurality of electronically controlled switches comprise one of a FET, a bipolar transistor and a power MOSFET.

3. A power over Ethernet controller according to claim 1, wherein said control circuit is further operable to compare said at least one temperature indication with a maximum, and only in the event said at least one temperature indication does not exceed said maximum to operate said at least one of said plurality of switches to enable power to said first port.

4. A power over Ethernet controller according to claim 1, wherein said control circuitry and said electronically controlled switches comprise a single integrated circuit.

5. A power over Ethernet controller according to claim 1, wherein said at least one temperature sensor comprises a plurality of temperature sensors and said at least one temperature indication comprises a plurality of temperature indications each from a unique one of said plurality of temperature sensors, said time period being dependent on a function of said plurality of temperature indications.

6. A power over Ethernet controller according to claim 5, wherein said function comprises an average of said plurality of temperature indications.

7. A power over Ethernet controller according to claim 5, wherein said function comprises one of a weighted average of said plurality of temperature indications and a maximum of said plurality of temperature indications.

8. A power over Ethernet controller according to claim 1, wherein said time period is further dependent on at least one of package type, die heat conduction parameters and the presence or absence of heat conductive adhesive.

9. An electronically implemented dynamic successive start up method for use with ports having a heat generating inrush current limiting functionality associated therewith, the method comprising:

inputting at least one indication of temperature;
comparing said at least one temperature indication with maximum;
activating, only in an event said temperature indication does not exceed said maximum, power to a first port having associated therewith the heat generating inrush current limiting funtionality; and
delaying a time period dependent on said at least one indication of temperature,
whereby activating power to a second port having associated therewith the heat generating inrush current limiting functionality is permitted only after said delayed time period.

10. A method according to claim 9, wherein said at least one indication of temperature comprises a plurality of indications of temperature, said time period being dependent on a function of said plurality of indications of temperature.

11. A method according to claim 10, wherein said function comprises one of an average, a weighted average and a maximum of said plurality of indications of temperature.

12. A method according to claim 9, wherein said time period is further dependent on at least one of package type, die heat conduction parameters and the presence or absence of heat conductive adhesive.

13. An electronically implemented dynamic successive start up method for use with ports each having a heat generating inrush current limiting functionality associated therewith, the method comprising:

inputting at least one indication of temperature;
comparing said at least one indication of temperature with a pre-determined maximum,
in the event that said at least one indication of temperature does not exceed said maximum, activating power to a first port; having associated therewith the heat generating inrush current limiting funtionality; and
delaying a time period dependent on said at least one indication of temperature,
whereby activating power to a second port having associated therewith the heat generating inrush current limiting functionality is permitted only after said delayed time period.

14. A method according to claim 13, wherein said at least one indication of temperature comprises a plurality of indications of temperature, said time period being dependent on a function of said plurality of indications of temperature.

15. A method according to claim 14, wherein said function comprises one of an average, a weighted average and a maximum of said plurality of indications of temperature.

16. A method according to claim 13, wherein said time period is further dependent on at least one of package type, die heat conduction parameters and the presence or absence of heat conductive adhesive.

17. A power over Ethernet controller comprising:

control circuitry;
at least one temperature sensor operatively connected to said control circuitry; and
a plurality of electronically controlled switches responsive to said control circuit, each of said electronically controlled switches enabling power to a respective port and having associated therewith inrush current limiting functionality, said control circuit being operative to:
input at least one indication of temperature from said at least one temperature sensor;
operate at least one of said plurality of electronically controlled switches thereby enabling power to a first port; and
delay a time period dependent on a function of said at least one temperature indication and at least one of package type, die heat conduction parameters and the presence or absence of heat conductive adhesive,
whereby operation of a second of said plurality of electronically controlled switches to enable power to a second port is permitted only after said delayed time period.

18. A power over Ethernet controller according to claim 17, wherein said control circuit is further operable to compare said at least one temperature indications with a maximum, and only in the event said at least one temperature indication does not exceed said maximum to operate said at least one of said plurality of switches to enable power to said first port.

19. A power over Ethernet controller according to claim 17, wherein said control circuitry and said plurality of electronically controlled switches comprise a single integrated circuit.

* * * * *